United States Patent
Kikumoto (10) Patent No.: US 9,704,078 B2
(45) Date of Patent: Jul. 11, 2017

(54) INFORMATION PROCESSING APPARATUS, METHOD, AND NON-TRANSITORY COMPUTER READABLE MEDIUM STORING PROGRAM FOR DISPLAYING AN IMAGE FORMED ON ROLL PAPER

(71) Applicant: FUJI XEROX CO., LTD., Tokyo (JP)

(72) Inventor: Takashi Kikumoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/051,416

(22) Filed: Feb. 23, 2016

(65) Prior Publication Data

US 2017/0091603 A1    Mar. 30, 2017

(30) Foreign Application Priority Data

Sep. 25, 2015   (JP) .................................. 2015-187685

(51) Int. Cl.
*G06K 15/00*    (2006.01)
*G06K 15/02*    (2006.01)

(52) U.S. Cl.
CPC ....... *G06K 15/4065* (2013.01); *G06K 15/005* (2013.01); *G06K 15/024* (2013.01)

(58) Field of Classification Search
None
See application file for complete search history.

(56) References Cited

U.S. PATENT DOCUMENTS 9,171,389 B2 * 10/2015 Roumier ............... G06F 3/1205
2016/0272451 A1 *  9/2016 Yamashita .......... G06K 15/4025

FOREIGN PATENT DOCUMENTS

JP    2015-007957 A    1/2015

OTHER PUBLICATIONS

Machine translation of Japanese Appl. No. 2015-007957 to Tatsumoto et al., published Jan. 2015.*

* cited by examiner

*Primary Examiner* — Paul F Payer
(74) *Attorney, Agent, or Firm* — Oliff PLC (57) ABSTRACT

An information processing apparatus including an acquisition portion that acquires a diameter of roll paper on which images are formed by an image forming apparatus and which is rolled by a roll apparatus; and a first display controller that causes, when image formation of an image group is instructed to the image forming apparatus, a roll paper image indicating a position where the image group is formed in the rolled roll paper to be displayed on a display portion, on a basis of a first diameter acquired when image formation of the image group is started and a second diameter acquired when image formation of the image group is completed.

8 Claims, 10 Drawing Sheets

| IMAGE GROUP | IMAGE FORMATION STATUS | ROLL RADIUS AT BEGINNING OF IMAGE FORMATION | ROLL RADIUS AT END OF IMAGE FORMATION |
|---|---|---|---|
| G01 | COMPLETED | 5 cm | 55 cm |
| G02 | COMPLETED | 55 cm | 75 cm |
| G03 | COMPLETED | 75 cm | 110 cm |
| G04 | NOT YET COMPLETED | 110 cm | — |

| DESIGNATED POSITION INFORMATION | 5 cm | ·· | 55 cm | ·· | 110 cm | ·· |
|---|---|---|---|---|---|---|
| LENGTH OF ROLL PAPER | 0 m | ·· | 800 m | ·· | 3000 m | ·· |

| EVENT | ROLL RADIUS WHEN EVENT OCCURS |
|---|---|
| BLANK PAPER | 30 cm |
| SEAM | 90 cm |

| DESIGNATED POSITION INFORMATION | 5 cm | · · | 55 cm | · · | 110 cm | · · |
|---|---|---|---|---|---|---|
| PAGE NUMBER | 0 | · · | 2400 | · · | 9000 | · · |

FIG. 16

INFORMATION PROCESSING APPARATUS, METHOD, AND NON-TRANSITORY COMPUTER READABLE MEDIUM STORING PROGRAM FOR DISPLAYING AN IMAGE FORMED ON ROLL PAPER

CROSS-REFERENCE TO RELATED APPLICATIONS

This application is based on and claims priority under 35 USC 119 from Japanese Patent Application No. 2015-187685 filed Sep. 25, 2015.

BACKGROUND

The present invention relates to an information processing apparatus, an information processing method, and a non-transitory computer readable medium.

SUMMARY

According to an aspect of the invention, there is provided an information processing apparatus including an acquisition portion that acquires a diameter of roll paper on which images are formed by an image forming apparatus and which is rolled by a roll apparatus; and a first display controller that causes, when image formation of an image group is instructed to the image forming apparatus, a roll paper image indicating a position where the image group is formed in the rolled roll paper to be displayed on a display portion, on a basis of a first diameter acquired when image formation of the image group is started and a second diameter acquired when image formation of the image group is completed.

BRIEF DESCRIPTION OF THE DRAWINGS

Exemplary embodiments of the present invention will be described in detail based on the following figures, wherein.

DETAILED DESCRIPTION

1. Example

Figure 1:
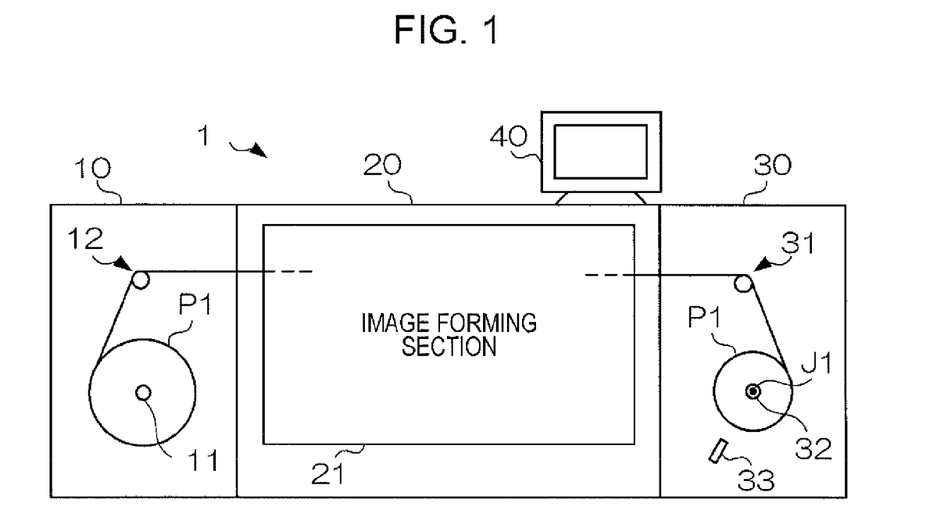
FIG. 1 shows the overall configuration of an image forming system according to Example.

FIG. 1 shows the overall configuration of an image forming system 1 according to Example. The image forming system 1 is a system for forming images on continuous paper, on which it is possible to form images continuously. In particular, the image forming system 1 forms images on roll paper, which is continuous paper rolled on a roll core rotated about a rotation shaft. The image forming system 1 includes a sheet feed apparatus 10, an image forming apparatus 20, and a paper roll apparatus 30, and a user interface (UI) apparatus 40. These apparatuses are connected to one another via communication lines (not shown).

The sheet feed apparatus 10 feeds continuous paper to the image forming apparatus 20. The sheet feed apparatus 10 includes a rotating part 11 and a transport part 12. The rotating part 11 rotates the roll core of roll paper P1 to feed the roll paper P1 rolled on the roll core to the transport part 12. The transport part 12 includes a roller and transports the roll paper P1 fed from the rotating part 11 to the image forming apparatus 20.

The image forming apparatus 20 includes an image forming section 21 for forming images on the continuous paper and forms images on the roll paper P1 fed from the sheet feed apparatus 10. The image forming section 21 transports the roll paper P1 to the paper roll apparatus 30 after forming images.

The paper roll apparatus 30 rolls the roll paper P1 transported from the image forming apparatus 20 around the roll core. The paper roll apparatus 30 is an example of a "roll apparatus" of the present invention. The paper roll apparatus 30 includes a transport part 31, a rotating part 32, and a sensor part 33. The transport part 31 transports the roll paper P1 transported from the image forming apparatus 20 to the rotating part 32. The rotating part 32 rotates the roll core attached thereto about a rotation shaft J1, thereby rolling the transported roll paper P1 around the roll core.

The sensor part 33 includes a sensor for measuring the diameter (in Example, radius) of the roll paper P1 rolled by the rotating part 32. For example, the sensor part 33 radiates light onto the roll paper P1 and measures the distance to the rolled roll paper P1, on the basis of the reflected light. The sensor part 33 preliminarily stores the distance to the center of the roll core attached to the rotating part 32, and, by subtracting the measured distance from the stored distance, the radius of the roll paper P1 is obtained. The sensor part 33 measures the radius of the rolled roll paper P1 at predetermined time intervals, and the measurement results are transmitted to the UI apparatus 40 after every measurement.

The UI apparatus 40 serves as an interface for a user of the image forming system 1. The UI apparatus 40 accepts input of operation instructions to the image forming system 1 and displays information generated by the image forming system 1. The UI apparatus 40 also displays a roll paper image, which shows the status of the roll paper P1, on the basis of the measurement results transmitted from the sensor part 33. The roll paper image will be described in detail below.

Figure 2:
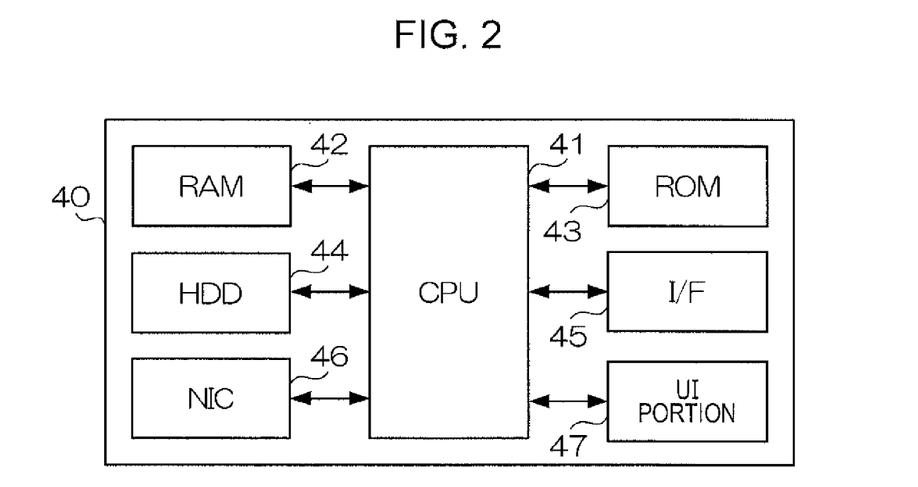
FIG. 2 shows the hardware configuration of a user interface (UI) unit.

FIG. 2 shows the hardware configuration of the UI apparatus 40. The UI apparatus 40 is a computer including a central processing unit (CPU) 41, a random-access memory (RAM) 42, a read-only memory (ROM) 43, a hard disk drive (HDD) 44, an interface (I/F) 45, a network interface card (NIC) 46, and a UI portion 47. The CPU 41 controls the operations of the respective parts by running programs stored in the ROM 43 and HDD 44, using the RAM 42 as a work area.

The HDD 44 stores data and programs used by the CPU 41 for performing control. The I/F 45 is an interface used when data is exchanged with the sheet feed apparatus 10, the image forming apparatus 20, and the paper roll apparatus 30. The NIC 46 has a communication circuit and communicates with an external device via a communication line (not shown). The UI portion 47 includes a display and a touchscreen layered on the top of the display area of the display. The UI portion 47 displays an image and accepts input of operation instructions from a user. The UI portion 47 is an example of a "display portion" of the present invention.

Figure 3:
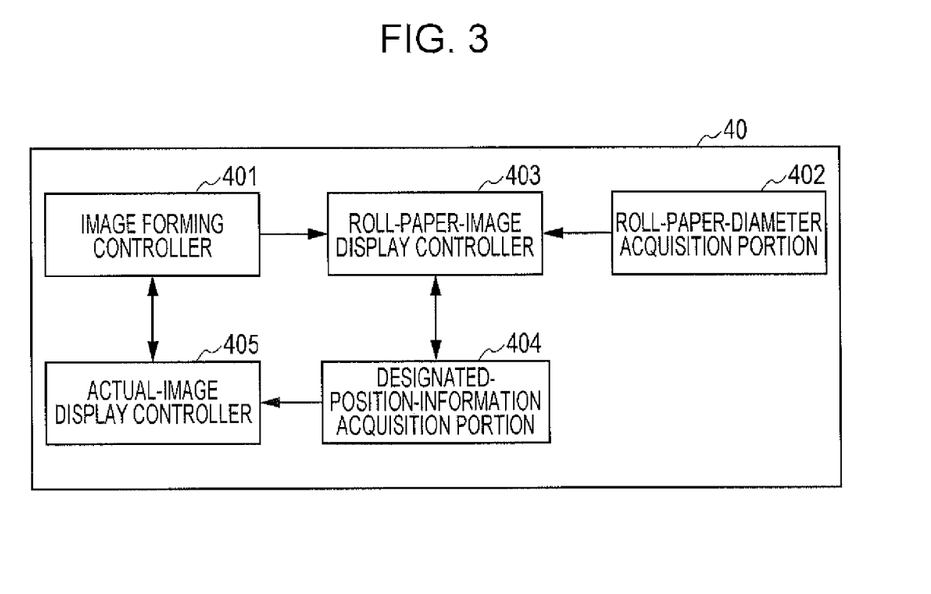
FIG. 3 shows the functional configuration of the UI unit.

When the CPU 41 of the UI apparatus 40 runs a program, the function shown in FIG. 3 is achieved.

FIG. 3 shows the functional configuration of the UI apparatus 40. The UI apparatus 40 includes an image forming controller 401, a roll-paper-diameter acquisition portion 402, a roll-paper-image display controller 403, a designated-position-information acquisition portion 404, and an actual-image display controller 405.

The image forming controller 401 controls image forming operations performed by the image forming section 21. When image data of an image group of which images are to be formed is transmitted from, for example, an external device, the image forming controller 401 converts the image data into image data of a format processible by the image forming section 21, supplies the converted image data to the image forming section 21, and instructs the image forming section 21 to form images according to the image data. When the instructed image formation of the image group is completed, the image forming controller 401 instructs image formation of a next image group. When image formation of an image group is started and completed, the image forming controller 401 reports the roll-paper-image display controller 403 to that effect.

The roll-paper-diameter acquisition portion 402 acquires the diameter (in Example, radius) of the roll paper rolled by the paper roll apparatus 30 after images are formed thereon by the image forming apparatus 20. The roll-paper-diameter acquisition portion 402 is an example of an "acquisition portion" of the present invention. The roll-paper-diameter acquisition portion 402 acquires the aforementioned measurement results (i.e., the radius of the roll paper P1) transmitted from the sensor part 33 as the diameter of the roll paper. The roll-paper-diameter acquisition portion 402 supplies the acquired diameter of the roll paper to the roll-paper-image display controller 403.

When the image forming controller 401 instructs the image forming apparatus 20 to form images of an image group, the roll-paper-image display controller 403 causes a roll paper image showing the position where the image group is formed in the roll paper rolled by the paper roll apparatus 30 to be displayed on the UI portion 47, shown in FIG. 2. The roll-paper-image display controller 403 is an example of a "first display controller" of the present invention.

The roll-paper-image display controller 403 causes the roll paper image to be displayed on the basis of a first diameter (in Example, a first radius) acquired when instructed image formation of an image group is started and a second diameter (in Example, a second radius) acquired when the image formation is completed. The roll-paper-image display controller 403 stores a roll-paper status table that associates the diameter of the rolled roll paper sent from the roll-paper-diameter acquisition portion 402 with the image formation status of the image group.

Figure 4:
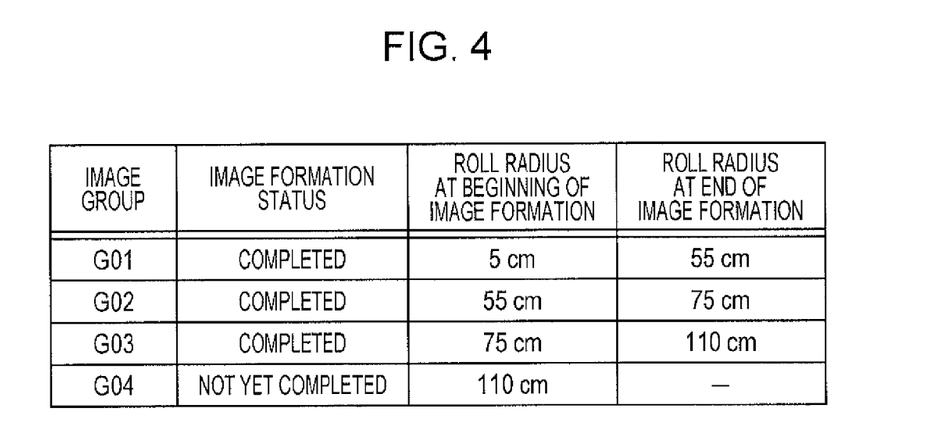
FIG. 4 shows an example of a roll-paper status table.

FIG. 4 shows an example of the roll-paper status table. In the example in FIG. 4, the image groups G01, G02, and G03, of which images have already been formed, and the image group G04, of which images have not yet been formed (image formation of the image group G01 is first instructed, and image formation of the image group G04 is finally instructed), are associated with acquired roll paper radii, that is, the roll radii of the roll paper. For example, the image group G01 is associated with a roll radius at the beginning of image formation of 5 cm and a roll radius at the end of image formation of 55 cm.

This roll radius at the beginning of image formation is an example of the roll paper radius when instructed image formation of an image group is started, that is, an example of the "first radius". The roll radius at the end of image formation is an example of the roll paper radius when the image formation is completed, that is, an example of the "second radius".

Similarly, the image group G02 is associated with a roll radius at the beginning of image formation of 55 cm and a roll radius at the end of image formation of 75 cm, and the image group G03 is associated with a roll radius at the beginning of image formation of 75 cm and a roll radius at the end of image formation of 110 cm. The image group G04 is associated with a roll radius at the beginning of image formation of 110 cm but is not associated with a roll radius at the end of image formation, because the image formation is not yet completed. The roll-paper-image display controller 403 causes the roll paper image to be displayed on the basis of the roll-paper status table stored in this way.

Figure 5:
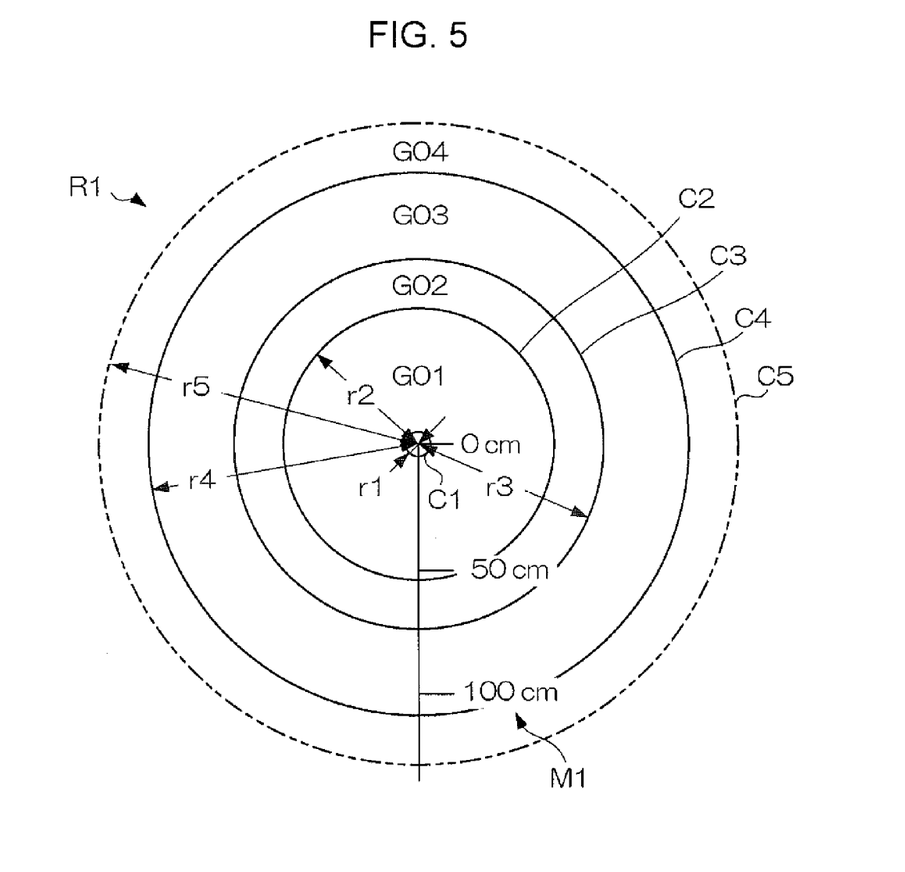
FIG. 5 shows an example of a displayed roll paper image.

FIG. 5 shows an example of the displayed roll paper image. In the example in FIG. 5, a roll paper image R1 showing the positions where the image groups G01, G02, G03, are G04 formed is displayed. The roll paper image R1 shows an outer circumferential circle C1, which indicates the outer circumference of the roll core, and an outer circumferential circle C2, which indicates the outer circumference of the portion on which the image group G01 is formed in the roll paper. The outer circumferential circle C1 is also a circle that indicates the inner circumference of the portion on which the image group G01 is formed in the roll paper.

That is, the outer circumferential circle C1 is a circle having a roll paper radius acquired when image formation of the image group G01 is started (i.e., a circle having the first radius), and the outer circumferential circle C2 is a circle having a roll paper radius acquired when image formation of the image group G01 is completed (i.e., a circle having the second radius). The roll-paper-image display controller 403 causes the outer circumferential circles C1 and C2 of the roll paper to be displayed, on the basis of the roll radius at the beginning of image formation (i.e., the first radius) and the roll radius at the end of image formation (i.e., the second radius) stored in the roll-paper status table shown in FIG. 4.

More specifically, the roll-paper-image display controller 403 causes an image to be displayed, as the roll paper image, in which a first circle (in the example in FIG. 5, the outer circumferential circle C1) and a second circle (in the example in FIG. 5, the outer circumferential circle C2) with a diameter ratio equal to the ratio of the first and second diameters are concentrically indicated. In the case of the image group G01, because the first diameter is 5 cm, and the second diameter is 55 cm, the ratio of the radius r1 of the outer circumferential circle C1 to the radius r2 of the outer circumferential circle C2 is 5:55 (1:11).

In the case of the image group G02, because the first diameter is 55 cm, and the second diameter is 75 cm, the ratio of the radius r2 of the outer circumferential circle C2 to the radius r3 of the outer circumferential circle C3 is 55:75 (11:15). In the case of the image group G03, because the first diameter is 75 cm, and the second diameter is 110 cm, the ratio of the radius r3 of the outer circumferential circle C3 to the radius r4 of the outer circumferential circle C4 is 75:110 (15:22).

The portion between the outer circumferential circles C1 and C2 represents a portion where the image group G01 is formed in the roll paper. This portion is denoted by a text indicating the image group formed in this part (in this example, "G01"). Similarly, the portion between the outer circumferential circles C2 and C3 represents a portion where the image group G02 is formed in the roll paper, and the portion between the outer circumferential circles C3 and C4 represents a portion where the image group G03 is formed in the roll paper. In Example, by indicating the roll paper image in this manner, the positions of the image groups formed in the rolled roll paper (more specifically, the positions of the image groups formed in the rolled roll paper when the rolled roll paper is viewed in the direction along the rotation shaft J1) are indicated.

In the case of the image group G04, although the first diameter is 110 cm, because image formation has not yet been completed, the second diameter has not yet been determined. In such a case, the roll-paper-image display controller 403 causes the roll paper image to be displayed by using a third diameter, which is the roll paper diameter acquired when the roll paper image is displayed, instead of the second diameter. More specifically, the roll-paper-image display controller 403 causes an image to be displayed, as the roll paper image, in which a first circle (in the example in FIG. 5, the outer circumferential circle C4) and a third circle (in the example in FIG. 5, the outer circumferential circle C5) with a diameter ratio equal to the ratio of the first and third diameters are concentrically indicated.

In the example in FIG. 5, the roll paper diameter acquired when the roll paper image is displayed is assumed to be 130 cm. In this case, because the first diameter is 110 cm, and the third diameter is 130 cm, the ratio of the radius r4 of the outer circumferential circle C4 to the radius r5 of the outer circumferential circle C5 is 110:130 (11:13). The roll-paper-image display controller 403 indicates the third circle in a mode different from that of the first and second circles; in the example in FIG. 5, the roll-paper-image display controller 403 causes the first and second circles to be indicated in a solid line and the third circle in a two-dot chain line. By doing so, it is possible to know whether or not image formation of the outermost image group has been completed (i.e., if the third circle is indicated in a solid line, image formation has been completed, and if the third circle is indicated in a two-dot chain line, image formation has not yet been completed).

The roll-paper-image display controller 403 also causes a scale-mark image indicating the scale of the roll paper shown as the roll paper image to be displayed, together with the roll paper image. In the example in FIG. 5, a scale-mark image M1 that indicates the positions of a roll paper radius of 0 cm, 50 cm, and 100 cm is displayed. This allows a user to know approximate positions of the portions where the respective image groups are formed in the actual roll paper.

The designated-position-information acquisition portion 404 acquires the information (hereinbelow referred to as "designated position information") indicating the position designated by the user in the roll-paper-image displayed by the roll-paper-image display controller 403. For example, the designated-position-information acquisition portion 404 acquires, from the roll-paper-image display controller 403, the coordinates of the center of the outer circumferential circles included in the roll paper image and calculates the distance between the coordinates of the position designated by the user and the coordinates of the center of the outer circumferential circles, with the roll paper image being displayed. If the calculated distance is less than or equal to the radius of the outermost outer circumferential circle (in the example in FIG. 5, the radius r5 of the outer circumferential circle C5), the designated-position-information acquisition portion 404 determines that any position in the roll paper image is designated, acquires the distance as the designated position information, and supplies the information to the actual-image display controller 405.

The actual-image display controller 405 causes the image (hereinbelow referred to as "actual image") that is actually formed at the position, in the roll paper, corresponding to the position indicated by the designated position information, to be displayed on the UI portion 47. The actual-image display controller 405 is an example of a second display controller of the present invention. When the designated position information is supplied from the designated-position-information acquisition portion 404, the actual-image display controller 405 acquires, from the image forming controller 401, the number of pages in each image group and the size of each page as the information of the image groups formed in the roll paper.

The actual-image display controller 405 calculates the length of the roll paper between the inner end of the rolled roll paper and the position designated by the user, on the basis of the distance indicated by the supplied designated position information, that is, the distance between the center of the outer circumferential circles and the position designated by the user. If the thickness of the roll paper and the diameter of the roll core are known, it is possible to associate the distance indicated by the designated position information with the length of the roll paper to that position. Hence, the actual-image display controller 405 performs calculation by using, for example, a roll-paper length table that associates the designated position and the length of the roll paper.

Figure 6:
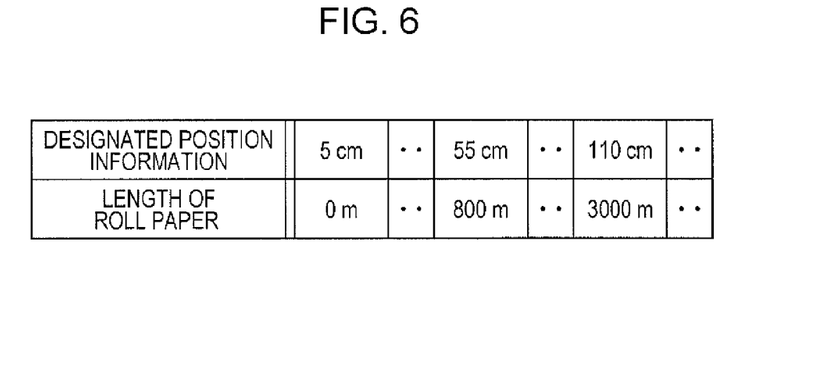
FIG. 6 shows an example of a roll-paper length table.

FIG. 6 shows an example of the roll-paper length table. In the example in FIG. 6, the distance indicated by the designated position information is shown as the distance in the actual roll paper. For example, when the designated position information indicates 5 cm, which equals the radius of the roll core, the length of the roll paper is 0 m. When the designated position information indicates 55 cm, the length of the roll paper is 800 m, and when the designated position information indicates 110 cm, the length of the roll paper is 3000 m. In Example, a preliminarily prepared roll-paper length table is used.

Figure 7A:
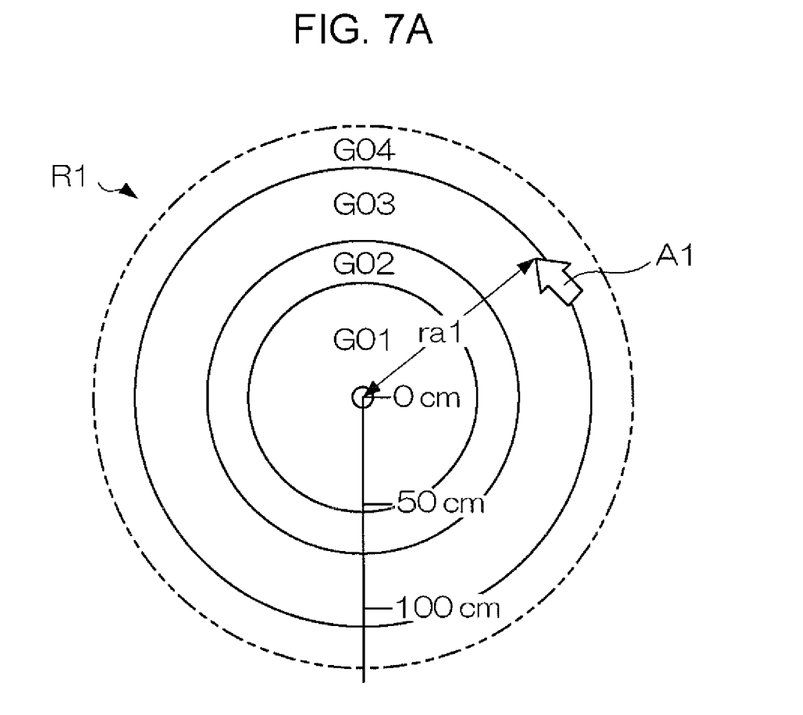
FIGS. 7A and 7B show an example of displayed actual images.
Figure 7B:
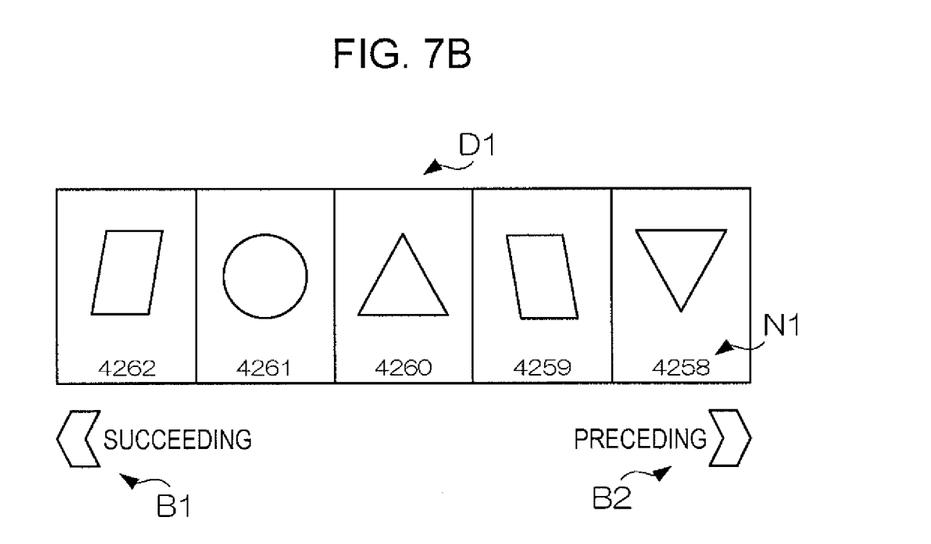

FIGS. 7A and 7B show an example of displayed actual images, wherein FIG. 7A shows a user-designated-position image A1, which shows the position, in the roll paper image R1, designated by the user. The designated-position-information acquisition portion 404 acquires a distance ra1 between the center of the outer circumferential circles and the position designated by the user as designated position information. The actual-image display controller 405 calculates the roll paper length associated with the acquired designated position information in the roll-paper length table as the roll paper length to the position designated by the user.

If the roll-paper length table does not contain the designated position information that matches the acquired designated position information, the actual-image display controller 405 calculates the roll paper length on the basis of the acquired designated position information and the preceding and succeeding designated position information. For example, when the roll-paper length table contains designated-position-information-and-roll-paper-length sets: 105 cm and 2700 m; and 110 cm and 3000 m, and when designated position information "107 cm" is acquired, the actual-image display controller 405 calculates 2700 m+(3000 m−2700 m)/(110 cm−105 cm)×(107 cm−105 cm)=2820 m as the roll paper length.

The actual-image display controller 405 specifies the actual image on the basis of the image group information acquired in the above-described way and the calculated roll paper length. For example, when the actual-image display controller 405 acquires image group information: the length, in the longitudinal direction, of the portion where one page of an image is formed in the roll paper is ⅓ m, and the numbers of pages in the image groups G01, G02, and G03 are 2400, 1800, and 4800 pages, respectively, the actual-image display controller 405 performs the following calculation: (2820 m−2400 pages×⅓ m−1800 pages×⅓ m)/⅓ m=4260 pages. The actual-image display controller 405 specifies the image in the image group G03, on the page specified by the calculation, as the actual image.

The actual-image display controller 405 causes an actual image group D1, which includes the actual image specified as above (in the example above, the image on the 4260 page) and the preceding and succeeding images, to be displayed, as shown in FIG. 7B. The actual-image display controller 405 also causes the page numbers N1 of the images contained in the actual image group D1 to be displayed. The actual-image display controller 405 also causes an operator image B1 for displaying the image group succeeding the displayed actual image group D1 and an operator image B2 for displaying the image group preceding the displayed actual image group D1 to be displayed. When one of these operator images is operated, the actual-image display controller 405 causes the image group corresponding to the operated operator (for example, when the operator image B1 is operated, the image group including 4263 page to 4267 page) to be displayed. As a result of the actual images being displayed in this manner, the image that is actually formed at the position, in the roll paper, corresponding to the position designated by the user in the roll paper image is known to the user.

Figure 8:
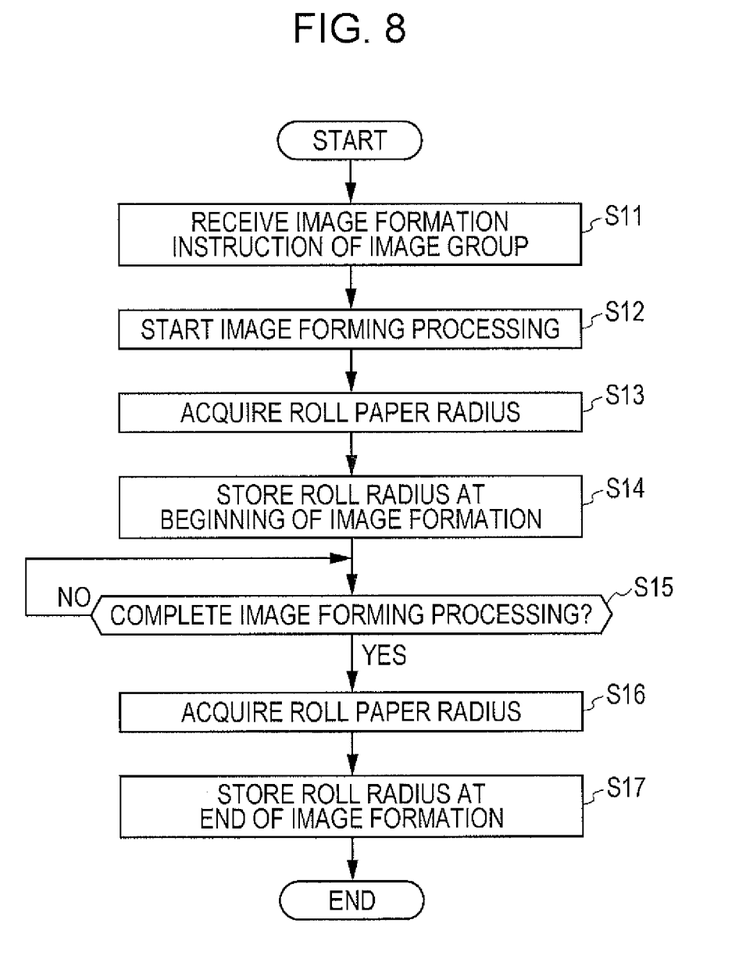
FIG. 8 is a flowchart showing an example of an operation process performed in roll-radius acquisition processing.
Figure 9:
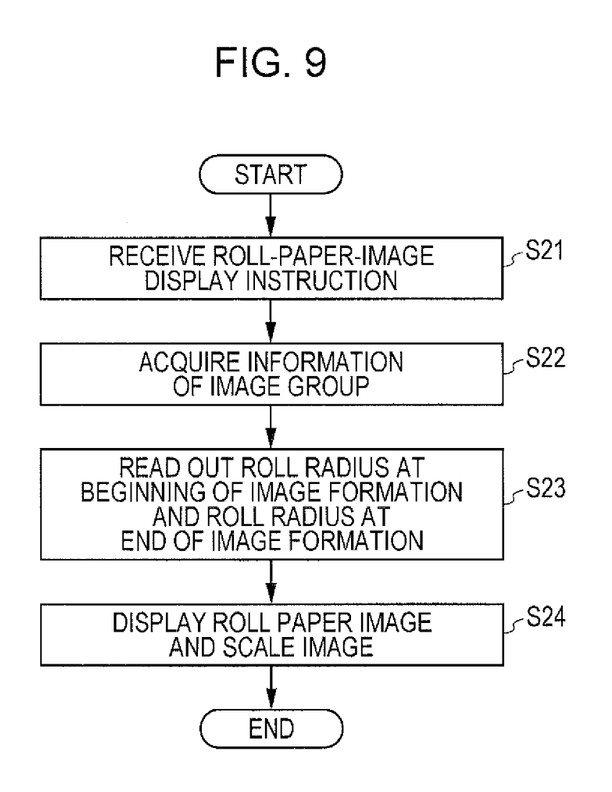
FIG. 9 is a flowchart showing an example of an operation process performed in roll-paper-image display processing.
Figure 10:
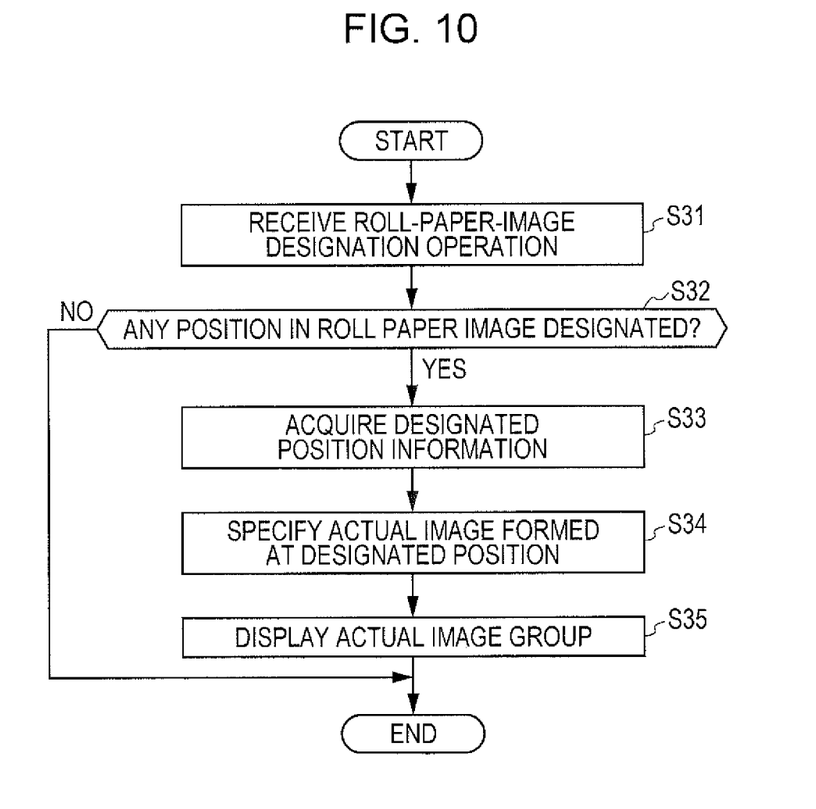
FIG. 10 is a flowchart showing an example of an operation process performed in actual-image displaying processing.

Referring to FIGS. 8 to 10, the operation of the UI apparatus 40 will be described.

FIG. 8 is a flowchart showing an example of an operation process performed in roll-radius acquisition processing. This operation process is started when image formation of an image group is instructed. The UI apparatus 40 (the image forming controller 401) first receives an image formation instruction of an image group (step S11) and starts image forming processing (step S12). Next, the UI apparatus 40 (the roll-paper-diameter acquisition portion 402) acquires the roll paper radius (step S13). Then, the UI apparatus 40 (the roll-paper-image display controller 403) stores the acquired roll paper radius as the roll radius at the beginning of image formation (step S14).

Then, the UI apparatus 40 (the roll-paper-diameter acquisition portion 402) performs determination as to whether or not the image forming processing has been completed until it is determined that the image forming processing has been completed (YES) (step S15), and when it is determined that the image forming processing has been completed (YES), the UI apparatus 40 (the roll-paper-diameter acquisition portion 402) acquires the roll paper radius (step S16). The UI apparatus 40 (the roll-paper-image display controller 403) then stores the acquired roll paper radius as the roll radius at the end of image formation (step S17), thus completing this operation process.

FIG. 9 is a flowchart showing an example of an operation process performed in roll-paper-image display processing. This operation process is started when a user performs an operation for causing a roll paper image to be displayed. First, the UI apparatus 40 (the roll-paper-image display controller 403) receives a roll-paper-image display instruction (step S21) and acquires information of the previously formed image groups (step S22).

Then, the UI apparatus 40 (the roll-paper-image display controller 403) reads out the roll radius at the beginning of image formation and the roll radius at the end of image formation, stored in the operation process shown in FIG. 8 (step S23). Then, the UI apparatus 40 (the roll-paper-image display controller 403 and the UI portion 47) displays a roll paper image and a scale-mark image (step S24) on the basis of the acquired image group information and the roll radius at the beginning of image formation and the roll radius at the end of image formation read out in the previous step, thus completing this operation process.

FIG. 10 is a flowchart showing an example of an operation process performed in actual-image displaying processing. This operation process is started when a user performs an operation for designating any position in the displayed roll paper image. The UI apparatus 40 (the designated-position-information acquisition portion 404) first receives designation operation for designating any position in a roll paper image (step S31), determines whether or not any position in the roll paper image is designated (step S32), and, when it is determined that any position in the roll paper image is designated (YES), the UI apparatus 40 (the designated-position-information acquisition portion 404) acquires designated position information (step S33).

Then, the UI apparatus 40 (the actual-image display controller 405) specifies the actual image formed at the designated position indicated by the acquired designated position information (step S34). The UI apparatus 40 (the actual-image display controller 405 and the UI portion 47) then displays the actual image group including the specified actual image (step S35) and completes this operation process. The UI apparatus 40 also completes this operation process when it is determined that a position outside the roll paper image is designated (NO) in step S32.

2. Modifications

Example described above is merely an example of the present invention, and it may be modified as follows. Note that Example and Modifications may be embodied in combination, when needed.

2-1. Unrolled Roll Paper Image

Figure 11:
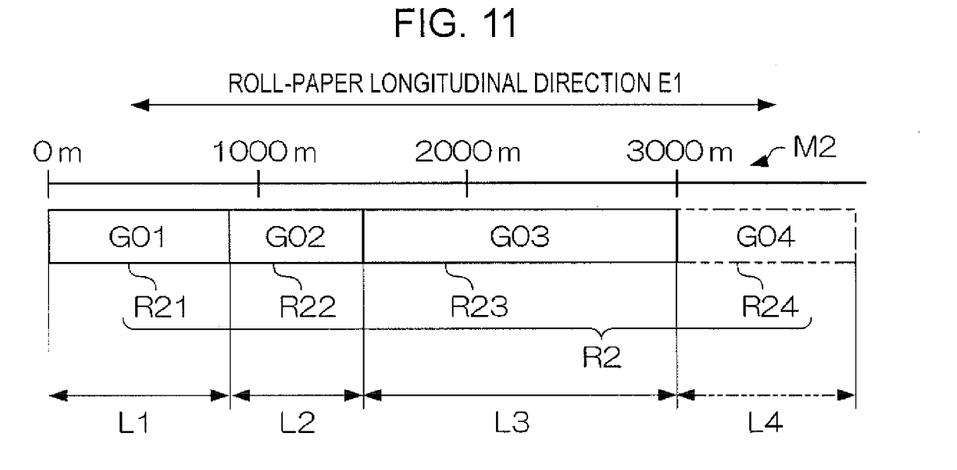
FIG. 11 shows an example of a displayed unrolled roll paper image.

The roll paper image may be different from that described in Example. For example, the roll-paper-image display controller 403 causes an image of an unrolled roll paper to be displayed on the UI portion 47 as the roll paper image. More specifically, the roll-paper-image display controller 403 causes an image showing, in an identifiable manner, the positions where the image groups are formed in an unrolled roll paper to be displayed as the roll paper image. This roll paper image will be referred to as an "unrolled roll paper image".

FIG. 11 shows an example of the displayed unrolled roll paper image. In FIG. 11, an unrolled roll paper image R2 showing the positions where the image groups G01, G02, G03, and G04 are formed. The unrolled roll paper image R2 includes rectangle images R21, R22, R23, and R24, which show the positions where the image groups G01, G02, G03, and G04 are formed in the roll paper, respectively. Each rectangle image is denoted by a text representing the corresponding image group.

FIG. 11 also shows a scale-mark image M2. The scale-mark image M2 shows the positions of a roll paper length, in the longitudinal direction E1, of 0 m, 1000 m, 2000 m, and 3000 m. The rectangle images R21, R22, R23, and R24 have lengths L1, L2, L3, and L4, respectively, in the longitudinal direction E1. These lengths show the lengths of the portions of the roll paper where the image groups are formed in the scale of the scale-mark image M2. For example, the length of the portion of the roll paper where the image group G01 is formed is 800 m, and the length of the portion of the roll paper where the image group G02 is formed is 600 m, etc.

The roll-paper-image display controller 403 indicates the portion representing the image group G04, of which image formation has not yet been completed, in a mode different from that of the portions representing the image groups G01, G02, and G03, of which image formation has already been completed. In the example in FIG. 11, the image groups G01, G02, and G03 are indicated as rectangles in a solid line, and the image group G04 is indicated as a rectangle in a two-dot chain line. Thus, the length L4 also shows the portion where images of the image group G04 have been formed by the time the unrolled roll paper image R2 is displayed. According to this Modification, the positions of the image groups are indicated on an unrolled roll paper.

2-2. Indication of Portion where Images are not Formed

Figure 12:
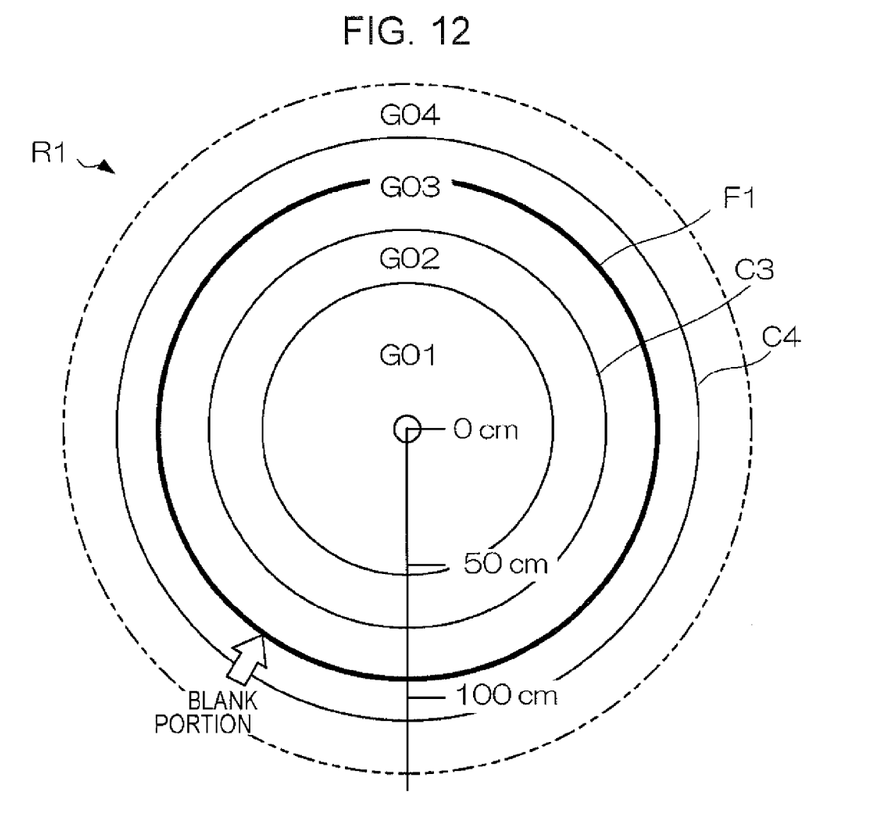
FIG. 12 shows an example of a roll paper image according to a Modification.

Sometimes, the roll paper may have portions where images are not formed. Such portions may occur when, for example, the roll paper is transported without images being formed thereon during recovery from an inconvenience occurring in an image forming operation, when processing by a raster image processor (RIP) is delayed, when the roll paper is fed to the end and new roll paper is joined thereto, etc. In this Modification, the roll-paper-image display controller 403 causes a blank portion image, which shows a portion where images are not formed in the roll paper (hereinbelow referred to as "blank portion"), to be displayed as a roll paper image.

FIG. 12 shows an example of a roll paper image according to this Modification. In the example in FIG. 12, a blank portion image F1 is indicated in the portion where the image group G03 is shown in the roll paper image R1 in FIG. 5 (i.e., the portion between the outer circumferential circles C3 and C4). In this example, the blank portion image F1 is indicated as a circle drawn with a thicker line than the other outer circumferential circles, and an arrow pointing the blank portion image F1 and a text "blank portion", which indicates that this portion is a blank portion and no image is formed therein, are indicated.

Figure 13:
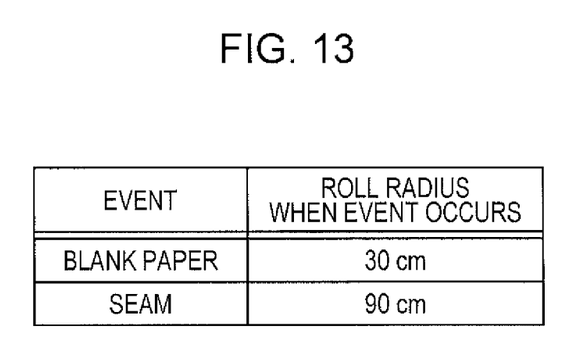
FIG. 13 shows an example of roll paper radius associated with an event.

When an event that a blank portion appears occurs, the roll-paper-image display controller 403 stores the event and the roll paper radius acquired by the roll-paper-diameter acquisition portion 402 at this event in an associated manner.

FIG. 13 shows an example of roll paper radius associated with an event. In the example in FIG. 13, the radius acquired when an event "blank (i.e., an event that images are not formed due to an inconvenience or the like)" occurs is 30 cm, and the radius acquired when an event "seam" occurs (the roll diameter when an event occurs) is 90 cm. The roll-paper-image display controller 403 causes a circle with a radius equal to the stored roll diameter when an event occurs to be displayed as a blank portion image. By displaying the blank portion image in this manner, the position of the portion where images are not formed in the rolled roll paper is shown.

Figure 14:
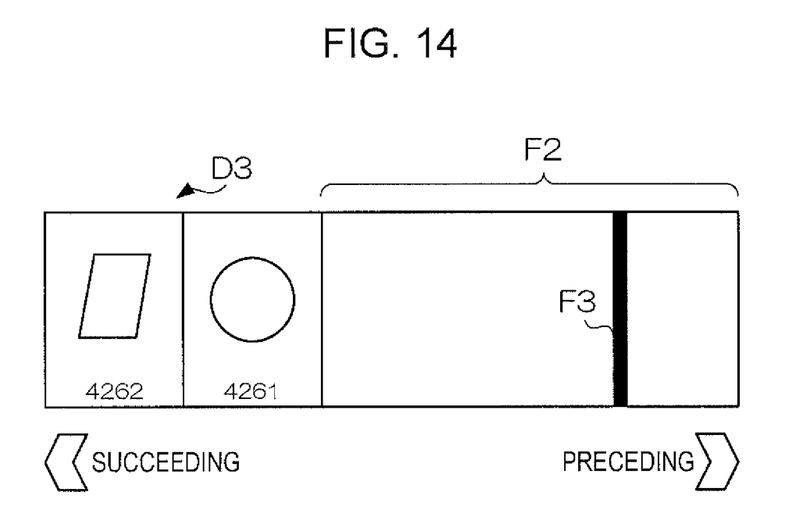
FIG. 14 shows an example of actual images according to a Modification.

The roll-paper-image display controller 403 displays the blank portion image (the image showing the portion where images are not formed in the roll paper) also when the above-described actual images are displayed.

FIG. 14 shows an example of actual images according to this Modification. In the example in FIG. 14, a blank portion image F2, in which images are not formed, is indicated next to an actual image group D3 including page 4261 and page 4262 of the image group G03. Furthermore, in this example, roll paper is added, and the roll-paper-image display controller 403 causes a boundary image F3, which indicates the boundary of the roll paper, to be displayed, as shown in FIG. 14. By doing so, it is possible to know the fact that the roll paper is added and the position of the boundary.

2-3. Generation of Roll-Paper Length Table

Although the roll-paper length table, as shown in FIG. 6, is preliminarily formed in Example, the table may be formed on the basis of the information, such as the roll paper diameter, acquired by the roll-paper-diameter acquisition portion 402. For example, the roll-paper-diameter acquisition portion 402 supplies the acquired roll paper radius to the actual-image display controller 405, and at the same time, the image forming controller 401 supplies information about the page number and size of the image formed on the medium to the actual-image display controller 405.

The actual-image display controller 405 calculates the length of the roll paper from the supplied information about the page number and size of the image, calculates the area of the circle having the radius supplied with the aforementioned information, and stores a table that associates them in the form of a roll-paper length table. The roll-paper length table stored in this way may be used when images are formed on another roll paper, as long as the thickness of the roll paper is the same.

2-4. Method for Calculating Length of Roll Paper

The actual-image display controller 405 may calculate the length L11 of the roll paper between the inner end of the rolled roll paper and the position designated by the user by using a method different from that used in Example, that is, a method not using the roll-paper length table. For example, if the diameter of the roll core is small enough to be ignored, the length of the roll paper is proportional to the area of the circle on the side surface.

Thus, when it is known that: if the area of the circle on the side surface is S12, the length of the roll paper is L12, the actual-image display controller 405 calculates the area S11 of a circle having a circumference designated by a user and calculates L11=L12/S12×S11 to obtain the length L11 of the roll paper. The actual-image display controller 405 calculates S12 from, for example, the roll paper radius acquired when image formation of the image group G01 is completed and calculates L12 from the page number and size of the image group G01. This method does not require the roll-paper length table shown in FIG. 6.

2-5. Calculation of Page Number

Instead of calculating the length of the roll paper to the position designated by the user, the actual-image display controller 405 may calculate the page number of the image formed at that position. The actual-image display controller 405 uses, for example, a page number table that associates designated position information with page number, instead of the roll-paper length table shown in FIG. 6.

Figure 15:
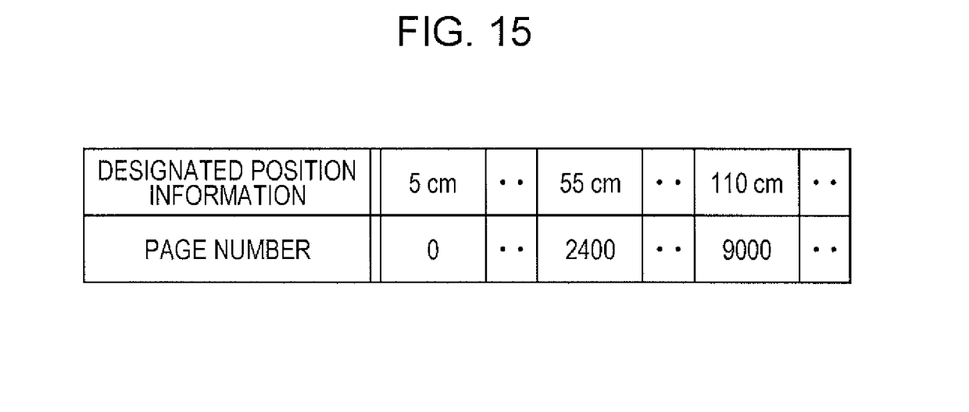
FIG. 15 shows an example of a page number table.

FIG. 15 shows an example of the page number table. The example in FIG. 15 shows a page number table that associates designated position information with page number such that: when the designated position is 5 cm, the page number is 0, when the designated position is 55 cm, the page number is 2400, and when the designated position is 110 cm, the page number is 9000. The actual-image display controller 405 calculates the page number of the image formed at the position designated by a user by using the acquired designated position information and the page number table, similarly to the case where the length of the roll paper is calculated by using the roll-paper length table, as in the case of Example, and displays the image on that page (i.e., the page counted from the image group G01) as the actual image. Furthermore, for example, similarly to the above-described Modification, if the roll core diameter is small enough to be ignored, the actual-image display controller 405 may calculate the page number on the basis of the area of the circle on the side surface and may display the image on the calculated page as the actual image.

2-6. Sensor for Measuring Length of Roll Paper

Although the length of the roll paper is calculated from the size and the number of images formed on the roll paper in Example and Modifications above, it is possible to use a sensor for measuring the length of the roll paper.

Figure 16:
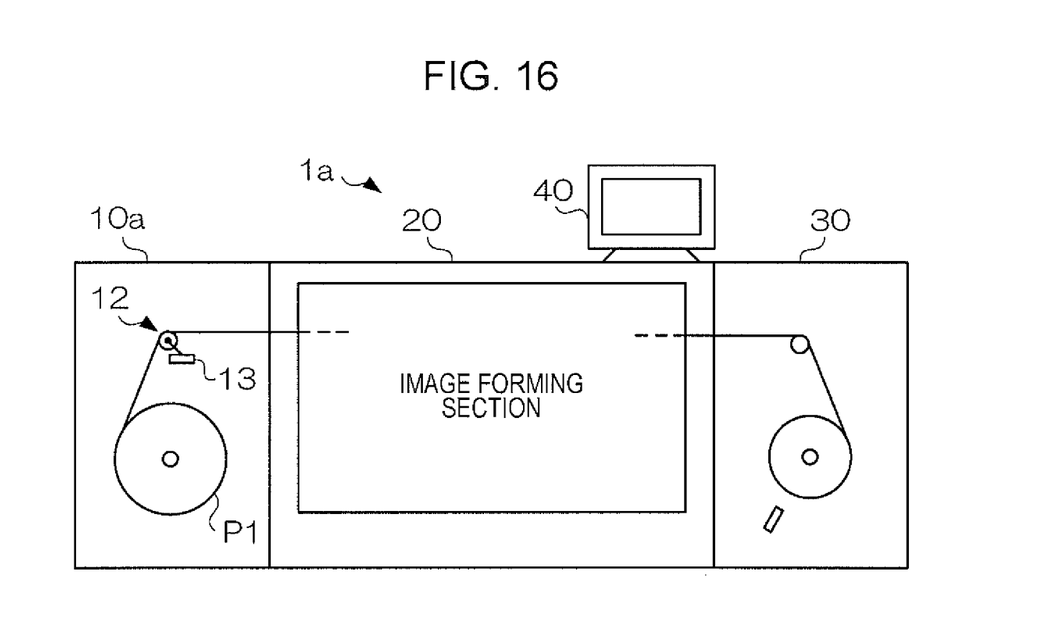
FIG. 16 shows the overall configuration of an image forming system according to a Modification.

FIG. 16 shows the overall configuration of an image forming system 1a according to this Modification. A sheet feed apparatus 10a of the image forming system 1a includes a sensor part 13 for measuring the travelling distance of the roll paper P1.

The sensor part 13 includes, for example, a rotation number sensor for measuring the number of rotations of the roller of the transport part 12 and measures the number of rotations of the roller. For example, the actual-image display controller 405 calculates the measured number of rotations multiplied by the length of the circumference of the roller as the travelling distance of the roll paper P1, that is, the length of the roll paper transported. In this way, even when a blank portion as described above occurs, the length of the roll paper is calculated. The sensor provided in the sensor part 13 is not limited to the rotation number sensor, but may be any other sensors, such as optical sensors, that may be used to calculate the length of the roll paper.

2-7. Apparatuses for Achieving Respective Functions

The components shown in FIG. 3 may be provided by an apparatus (for example, the controller of the image forming apparatus 20, a client terminal connected to the image forming apparatus 20 via a communication line, or the like) other than the UI apparatus 40. That is, any information processing apparatus may provide these components, as long as such an apparatus is capable of processing information, such as the roll paper diameter and the designated position, and performing operations performed by the components shown in FIG. 3.

2-8. Category of Invention

The present invention may be construed as an information processing apparatus, such as a UI terminal, and an image forming system having such an information processing apparatus. The present invention may also be construed as a processing method for achieving the processing performed by a computer that controls the information processing apparatus and a program for making the computer function as the components shown in FIG. 3. This program is provided in the form of, for example, a recording medium that stores the program, such as an optical disc, or in a form capable of being downloaded, via a communication line, such as the Internet, to and installed in a computer to be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an acquisition portion that acquires a diameter of roll paper on which images are formed by an image forming apparatus and which is rolled by a roll apparatus; and
    a first display controller that causes, when image formation of an image group is instructed to the image forming apparatus, a roll paper image indicating a position where the image group is formed in the rolled roll paper to be displayed on a display portion, on a basis of a first diameter acquired when image formation of the image group is started and a second diameter acquired when image formation of the image group is completed.

2. The information processing apparatus according to claim 1, wherein the first display controller causes an image to be displayed, as the roll paper image, in which a first circle and a second circle with a diameter ratio equal to a ratio of the first diameter and the second diameter are concentrically indicated.

3. The information processing apparatus according to claim 1, wherein the first display controller causes an image of unrolled roll paper indicating, in an identifiable manner, a position where the image group is formed in the unrolled roll paper to be displayed as the roll paper image.

4. The information processing apparatus according to claim 1, wherein the first display controller causes a scale-mark image indicating a scale of the roll paper shown in the roll paper image to be displayed, together with the roll paper image.

5. The information processing apparatus according to claim 1, further comprising a second display controller that causes an image formed at a position, in the roll paper, corresponding to the position designated by the user in the roll paper image displayed by the first display controller, to be displayed on the display portion.

6. The information processing apparatus according to claim 1, wherein the first display controller causes an image indicating a portion, in the roll paper, where an image is not formed to be displayed as the roll paper image.

7. An information processing method comprising:
    acquiring a diameter of roll paper on which images are formed by an image forming apparatus and which is rolled by a roll apparatus; and
    causing, when image formation of an image group is instructed to the image forming apparatus, a roll paper image indicating a position where the image group is formed in the rolled roll paper to be displayed on a display portion, on a basis of a first diameter acquired when image formation of the image group is started and a second diameter acquired when image formation of the image group is completed.

8. A non-transitory computer readable medium storing a program causing a computer to execute a process for processing information, the process comprising:
  acquiring a diameter of roll paper on which images are formed by an image forming apparatus and which is rolled by a roll apparatus; and
  causing, when image formation of an image group is instructed to the image forming apparatus, a roll paper image indicating a position where the image group is formed in the rolled roll paper to be displayed on a display portion, on a basis of a first diameter acquired when image formation of the image group is started and a second diameter acquired when image formation of the image group is completed.

* * * * *